United States Patent [19]

McManus

[11] Patent Number: 5,343,609

[45] Date of Patent: Sep. 6, 1994

[54] METHOD FOR ASSEMBLING A FLUSH GLASS WINDOW SEAL

[75] Inventor: Michael J. McManus, Rockford, Tenn.

[73] Assignee: Schlegel Corporation, Rochester, N.Y.

[21] Appl. No.: 121,704

[22] Filed: Sep. 15, 1993

[51] Int. Cl.$^5$ .............................................. B23P 11/00
[52] U.S. Cl. ........................................ 29/451; 29/458; 29/527.1; 264/177.17; 264/285
[58] Field of Search .............. 29/450, 451, 458, 527.1, 29/527.2; 264/177.1, 177.17, 177.19, 285, 339; 49/490.1

[56] References Cited

U.S. PATENT DOCUMENTS

| | | | |
|---|---|---|---|
| 2,052,585 | 9/1936 | Tannewitz | 264/285 |
| 3,068,136 | 12/1962 | Reid | 264/285 |
| 3,177,534 | 4/1965 | Millhouse et al. | 49/490.1 |
| 3,333,381 | 8/1967 | Stark et al. | |
| 3,374,578 | 3/1968 | Mesnel | 49/490.1 |
| 4,119,325 | 10/1978 | Oakley et al. | 49/490.1 |
| 4,511,526 | 4/1985 | Yamaguchi | 264/177.17 |
| 4,614,061 | 9/1986 | Brocke | 49/490.1 |
| 5,183,613 | 2/1993 | Edwards | 264/177.1 |

FOREIGN PATENT DOCUMENTS 0049409  4/1982  European Pat. Off. .

*Primary Examiner*—Mark Rosenbaum
*Assistant Examiner*—David P. Bryant
*Attorney, Agent, or Firm*—Cumpston & Shaw

[57] ABSTRACT

A flush glass window seal for motor vehicle windows having a substantially rigid, dual durometer thermoplastic elastomer, carrier component and a resilient elastomer, sealing insert which are mechanically locked together. The carrier components are extruded or molded in one piece to conform to the generally U-shaped vehicle opening and the insert is extruded in a generally flat configuration suitable for application of a slip surface thereon, prior to its insertion into the carrier.

6 Claims, 4 Drawing Sheets

METHOD FOR ASSEMBLING A FLUSH GLASS WINDOW SEAL

FIELD OF THE INVENTION

This invention relates generally to motor vehicle flush glass window seals and more particularly to decorative seals for sealing between a motor vehicle door frame and movable window glass panels and to methods for assembling the window seals.

BACKGROUND OF THE INVENTION

The motor vehicle industry, particularly the passenger car and van portions of the industry, are increasingly relying on flush glass window mounting for improving the appearance of motor vehicles and reducing the aerodynamic drag of the vehicles to make them more fuel efficient. A number of conflicting requirements for such seals makes them difficult and expensive to produce and install. The increasingly complex shape of motor vehicle bodies requires seals that are not simply bent in a plane to surround the top edge of a flat glass window. The seals are formed not only at the radii (corners of the glass) but are also arched vertically to coincide with the curved top surface of the glass and rounded sides of the automobile.

Heretofore, thermosetting materials such as ethylene-propylene-diene-monomer rubber (EPDM) have been used extensively for vehicle window seals. Some complex seals have included portions formed from other materials such as thermoplastic materials, but EPDM has usually been a major portion of the seal. EPDM has a number of characteristics that make it useful for forming window seals. It is relatively inexpensive, effective, easy to extrude, and has outstanding weatherability, resilience, resistance to abrasion, and durability. However, it has several disadvantages that make it increasingly hard to adapt to the ever more stringent requirements of the motor vehicle industry. Not the least of these disadvantages is that EPDM is normally made black. Second, in order to form EPDM into the complex shapes required by the motor vehicle industry, it is often necessary to provide separately manufactured molded corner pieces, and frequently a wire carrier, a stamped metal carrier or a solid metal support. Each of these adds to the cost of the seal.

To improve the appearance of motor vehicles, the industry demands window seals that are colored to enhance the appearance of the vehicle, usually by matching the body color. Obtaining a color on EPDM has been less than satisfactory in the past, whereas thermoplastics are readily colored.

Although EPDM is cost effective (inexpensive) as a material, the total cost of making and installing an EPDM seal on a motor vehicle is high. The seal must not only be formed at the radii of the glass by cutting, mitering or welding molded pieces, but it must also be arched in the vertical direction to coincide with the curved glass and rounded sides of the vehicle. To accomplish this with EPDM, a metal support internal to the EPDM is added, usually as the EPDM seal is extruded. Massive and expensive roll forming machinery and tooling and stretch bending equipment and tooling are required to form the extruded seal to the desired configuration in three dimensions. Thus, the total cost, that is the cost of the seal and the capital cost of equipment needed to form it, is high.

It is an object of this invention to provide an improved vehicle window glass seal that overcomes the disadvantages of known seals. The seal of the invention comprises two members, a substantially rigid first carrier member thermally formed from a hard, rigid or semi-rigid plastic and a soft plastic, and a second sealing member made from resilient material, preferably rubber. More particularly, it is an object of the invention to provide a seal in which the first member comprises a dual durometer, thermoplastic elastomer (TPE) which attaches to a vehicle body and can be color matched to an automobile and which can be thermally formed to match the contour of the vehicle, thus eliminating the need for the expensive, massive, roll forming machinery and tooling and stretch bending equipment and tooling mentioned before.

The first member can be thermally formed by extrusion or molding in one piece and conformed to the contour of the vehicle opening. Thus molded joint lines and the need for cutting, mitering or welding of the carrier member to fit the corners are avoided. The second member can be formed by extrusion of a one-piece, relatively flat rubber member which can be readily provided with a sliding surface, such as a slip coating or flocking.

The seal of the present invention has other advantages. The carder member formed from substantially rigid thermoplastic material does not require a wire carrier, a stamped metal carrier or a solid metal support and can be provided with a finish gloss as high as 60 compared to rubber which is usually limited to a 20 gloss or less. The assembly requires less labor and capital expenditures not only to produce, but to install. The completed assembly is lighter than the all-rubber assemblies used in the past. Overall, the seal of this invention is less expensive than known seals and is more versatile, more attractive, and easier to maintain.

SUMMARY OF THE INVENTION

Briefly stated and in accordance with a presently preferred embodiment of the invention a flush glass window seal for forming a seal between the body of a motor vehicle and a moveable window panel comprises a substantially rigid, plastic carrier-attaching body having a generally U-shaped first portion for attaching the window seal to the body of the motor vehicle, defined by a first base and first and second legs, a glass run channel portion of inverted U-shaped configuration defined by a second base, said second leg and a third leg, and first and second inwardly depending extensions on the ends of the second and third legs for forming first and second mounting channels at the ends of the legs; and a U-shaped resilient insert disposed in the glass run channel having at least two resilient sealing surfaces for forming a slideable seal with the window panel, and first and second anchoring lobes engaging the first and second mounting channels of the carrier for securing the insert within the glass run channel.

In accordance with a preferred aspect of this invention, the carrier-attaching body comprises two thermoplastic elastomers of different durometer values.

In accordance with another aspect of this invention, the carrier-attaching body is formed by coextrusion of the two thermoplastic elastomers.

In accordance with another aspect of this invention, the carrier-attaching body is formed by molding of the two thermoplastic elastomers.

In accordance with another aspect of this invention the carrier-attaching body comprises a thermoplastic elastomer selected from styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

In accordance with another aspect of this inventions, the resilient insert comprises an EPDM rubber. The resilient insert frequently includes a layer of slip coating or flocking on the surface for engaging the moveable glass panel.

In accordance with a still further aspect of this invention, the carrier and the resilient insert are formed separately and mechanically locked together.

In accordance with a still further aspect of this invention, the resilient insert includes one or more lobes for engaging the window panel.

In accordance with still another aspect of this invention, the carrier-attaching body includes a thin metal foil for increasing the rigidity of the glass run channel.

In accordance with still another aspect of this invention, the carrier-attaching body includes at least one fiberglass cord for decreasing shrinkage of the glass run channel.

In accordance with still another aspect of this invention the resilient insert is extruded in a generally flat configuration for facilitating the application of a sliding surface layer on the sealing surfaces.

The novel aspects of the invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
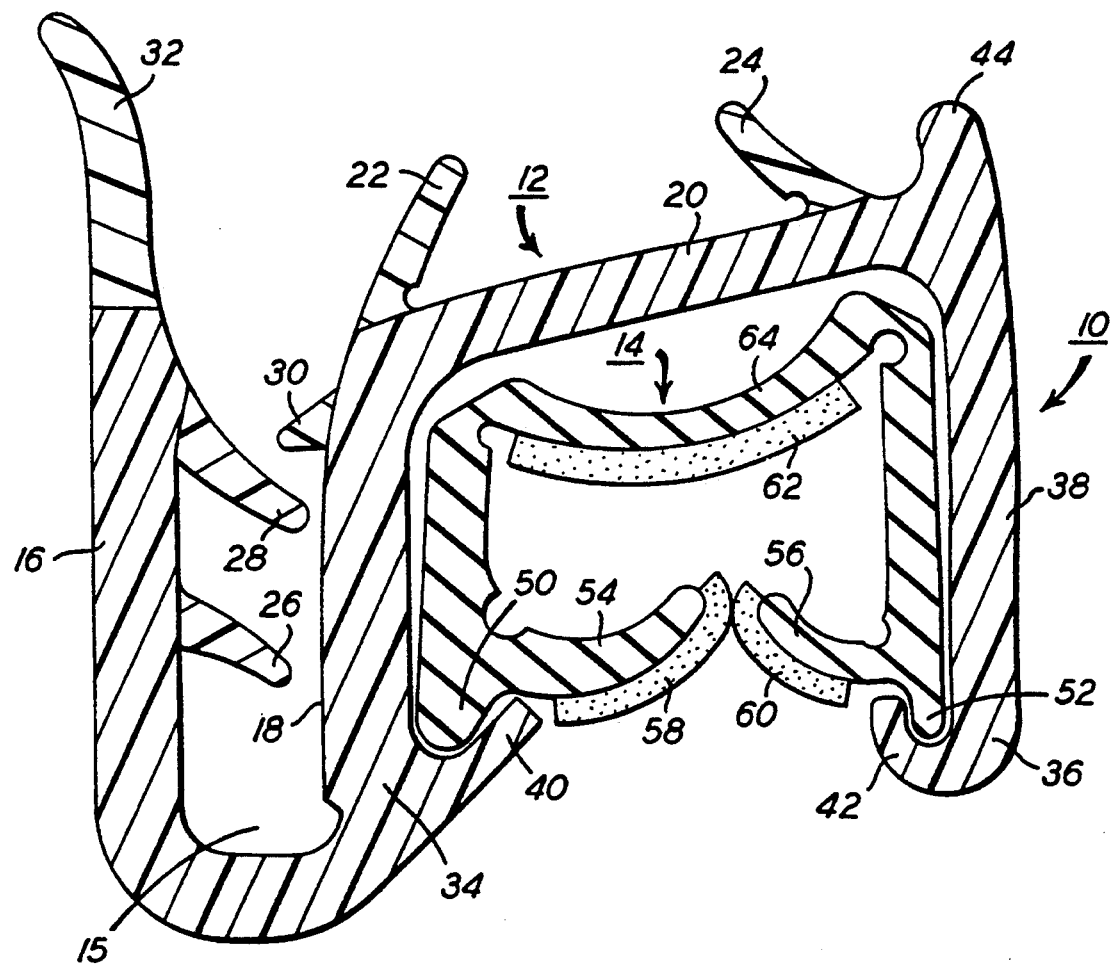
FIG. 1 is a section of a seal in accordance with the invention.

A flush glass window seal for a motor vehicle in accordance with this invention is shown in cross section in FIG. 1. The window seal 10 mounts to a door or window opening of a motor vehicle to engage three sides of a moveable window glass. The fourth side of the window glass that remains within the door or body of the vehicle is sealed by a belt line seal usually mounted thereon.

The window seal 10 includes two major functional members, a generally U-shaped carrier-attaching body member 12 adapted to mount on a flange surrounding the window opening of the motor vehicle, and a resilient window engaging insert member 14.

The carrier 12 includes a vehicle body engaging U-shaped first channel 15 formed between an outer leg 16 and an inner leg 18. The inner leg 18 forms a portion of the broader inverted U-shaped window run channel. The upper outside surface of the carrier base 20 of the inverted U-shape window run channel portion of the seal has two curved projections 22 and 24 extending upwardly and inwardly from the corners of the base for engaging the body of the motor vehicle and forming the seal to the body. In addition, the body engaging U-shaped first channel is preferably provided with one or more soft, preferably high sliding resistance, locking projections 26, 28, and 30 for firmly securing the carrier to the vehicle body. Projection 32 forms another seal to the vehicle body.

The ends 34, 36 of the legs 18, 38 of the window run channel 12 have curved inwardly depending extensions 40, 42 forming short interior channels at the opening of the window run channel. The opposite end 44 of the leg 38 extends upwardly to provide a neat appearance with the vehicle body.

The carrier attaching body member 12 is preferably formed from two different plastic materials, a substantially rigid, hard plastic and a soft plastic. The hard plastic is used to form the generally U-shaped frame comprising the legs 16, 18 and 38, and the base 20. The soft polymer is used to form the projections 22, 24, 26, 28, 30 and 32.

The plastic portions of the carrier can be formed from a number of different plastic materials, for example, thermoplastics and thermoplastic elastomers (TPEs). The distinction between thermoplastics and TPEs is not well defined (see Handbook of Thermoplastic Elastomers, 2nd Edition, Edited by B. M. Walker and C. P. Rader, Van Nostrand Reinhold Co., Inc., N.Y., 1988). Depending on their hardness TPEs are sometimes categorized as thermoplastics and sometimes as elastomers. For the purpose of this invention no such distinction will be made and hard and soft grades of plastic will all be referred to as TPEs.

TPEs are commercially available in several different brands and types. Each type can be obtained in different grades having different properties such as, hardness, tensile strength, compression, elongation, thermal stability and colorability. Selection of the appropriate TPE for a particular application depends on a suitable combination of such properties.

Types of TPEs which are particularly useful for the window seal of the invention are the styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

The different types of TPEs and their properties are described in detail by Walker and Rader, cited supra, the disclosure of which is hereby incorporated by reference. A brief description of some TPEs and sources are given infra.

Styrenic block copolymers are commercially available in many types (and grades within types), for example, Kraton® from Shell Chemical Co. is based on block copolymers of styrene with a diene or an olefin pair, ethylene-butylene. The diene can be isoprene or butadiene.

The rubber-polyolefin blends (or thermoplastic polyolefins (TPOs)) are blends of various polyolefins with ethylene-propylene rubber (EPR) or ethylene-propylene-diene-monomer (EPDM). Suitable polyolefins include polypropylene and various types of polyethylene. Copolymers of propylene and ethylene and blends of TPOs can also be used. TPOs are also useful as modifiers of other TPEs.

Alloying is an interactive combination of two or more materials to give a material having better properties than those of the corresponding blend. Thermoplastic alloys are available with properties enabling them to be painted. Thermoplastic elastomeric alloys and elastomeric alloys (EAs) are composed of synergistic mixtures of two or more polymers that have been treated to give them properties different from simple blends of the major constituents. The two types of elastomeric alloys are melt processible rubbers (MPRs) and thermoplastic vulcanizates (TPVs).

EA-MPRs are a category of TPEs made of a highly plasticized, single phase combination of a chlorinated polyolefin, an ethylene-vinyl acetate copolymer and an acrylic ester mixture in which the rubber phase is highly crosslinked, for example, Alcryn ® from E. I. du Pont Nemours, Inc. EA-TPVs are made of a rubber/plastic polymer mixture in which the rubber phase is fully crosslinked.

The plastic phase of a TPV is commonly a polyolefin (especially polypropylene), and the rubber phase is often an ethylene-propylene elastomer. A particularly useful TPV, suitable for windows seals, is formed from polypropylene and EPDM rubber and is commercially available in several grades as Santoprene ® from Monsanto Chemical Co.

Thermoplastic polyurethanes (TPUs) are formed by copolymerization of diisocyanates with long-chain diols and short-chain diols. TPUs are available commercially in a number of types and grades, for example, Texin ® from Mobay Corporation, Estane ® from B.F. Goodrich Co., Pellethane ® from Dow Chemical Corp. and Q-Thane ® from K.J. Quinn and Co., Inc.

Polyvinyl chloride (PVC) based TPEs are also suitable for window seals and are available in different grades and blends with other TPEs and rubbers. P-Valloy is one such material available from GBIE (Gerry Bareich Import Export Inc.) of Canada.

Thermoplastic ionomers are polymers containing interchain ionic bonding which affords tough, durable, transparent thermoplastics, for example, Surlyn ® from E. I. du Pont de Nemours, Inc.

The hard plastic portion of the carrier is formed from a rigid or semi-rigid TPE. A rigid TPE, for example a polypropylene, preferably has a hardness in the range of 65 to 85 durometers, preferably 75 durometers, according to the Shore D scale. A semi-rigid TPE, for example Kraton ®, has a hardness between 30 to 55 durometers preferably 50 durometers according to the Shore D scale.

The soft plastic portion of the carrier is formed from a softer more resilient TPE, for example Santoprene ®, having a hardness in the range of 50 to 95 durometers, preferably 70 durometers according to the Shore A scale.

Such hard and soft TPEs are readily processed and fabricated, for example, by extrusion or molding and are particularly amenable to coextrusion and simultaneous molding of two or more TPEs of different durometer values. The TPEs are readily colored to match the vehicle either by incorporating pigment or by painting. Directly paintable TPE's have a high surface energy material blended into the base polymer to accept water based paints without any pretreatment. Various hardnesses of this material are available from Ferro Corporation.

The hard TPEs can be made with a high gloss finish, for example a Class A finish or a gloss of at least 60 numerical value when measured at a 60° angle with a gloss meter is readily obtained which is substantially higher than can be obtained with an EPDM robber seal. This TPE needs to meet the exterior weathering cycle per SAE J1960 with minimum change in color or gloss.

A resilient sealing insert 14 is mechanically attached within the window run channel by two anchoring lobes 50, 52 that engage the curved extensions 40, 42 to secure the sealing insert in the window run channel of the carder.

The insert 14 which is preferably but not necessarily manufactured in an open, relatively flat configuration, is bent at its corners and inserted into the glass run channel of the carder. To aid fitting of the insert it can have multiple slits across its length or it can be punched out at the corners.

The insert has two sealing lobes 54, 56. The first, larger lobe 54 extends from the inside leg 18 of the glass run channel towards the outside leg 38. The second smaller lobe 56 extends from the outside leg 38 towards the inside leg 18. The lobes 54, 56 are tapered and can be solid or hollow. The lobes are sized and arranged so that when the window glass is withdrawn from the window run channel, the ends of the lobes engage each other as shown to close the channel. Preferably the surfaces of the lobes that engage the side surfaces of the window glass are provided with a sliding surface 58, 60 such as a slip coating or flocking. A similar sliding surface 62 is provided to an inside surface 64 of the insert 14 for engaging the edge of the window glass.

The sliding surface is any slip coating or flocking known to those skilled in the art, preferably flocking. Because the insert 14 can be made relatively flat, the flocking is easy to apply before the insert is folded and placed in the window run channel.

The resilient insert can be formed from a rubber, for example, natural rubber, styrene-butadiene rubber (SBR), ethylene-propylene rubber (EPR) or ethylene-propylene-diene-monomer (EPDM) rubber. EPDM is preferred and exhibits good compression set, durability and resistance to weathering.

Figure 2:
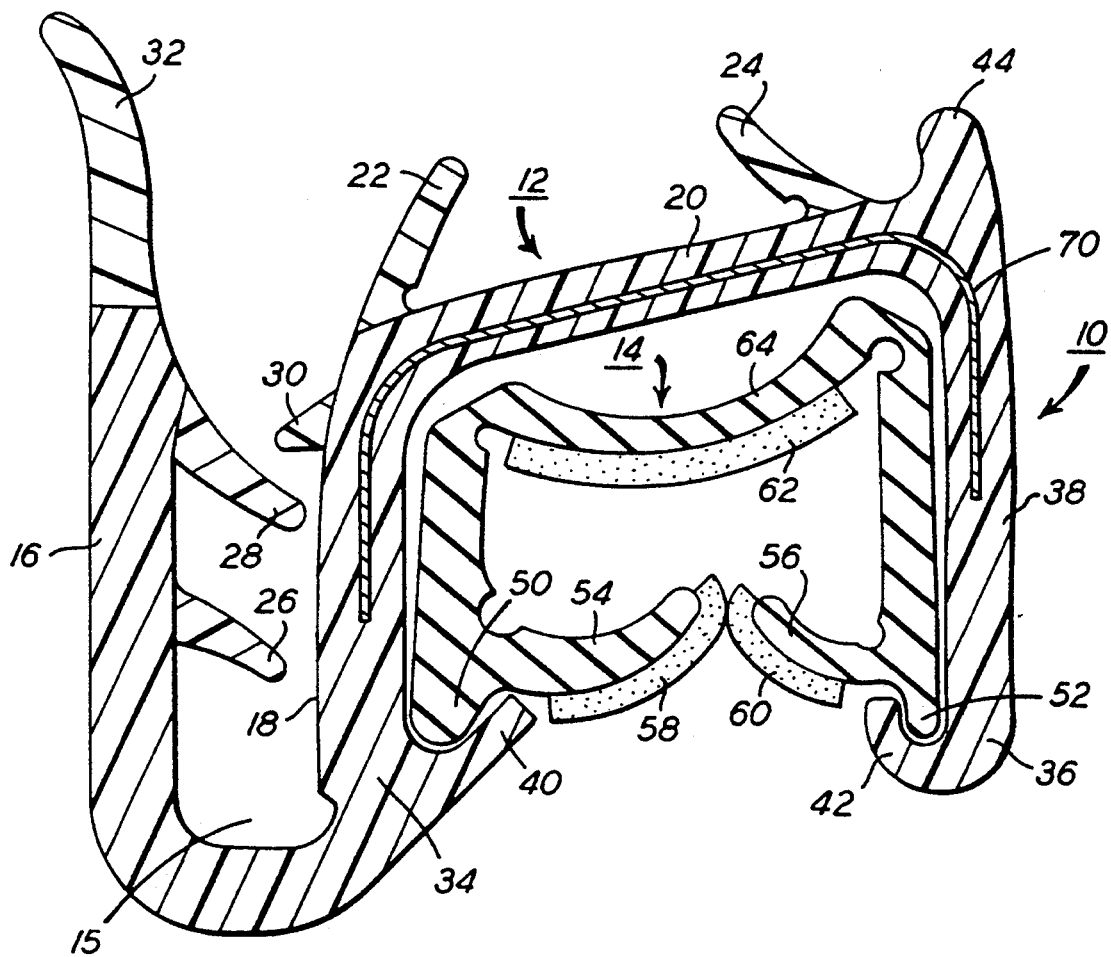
FIG. 2 is a section of a seal in accordance with a second aspect of the invention and incorporates a thin metal foil carrier.

In a second embodiment of the invention, FIG. 2, the window seal is essentially the same as that described for FIG. 1, with the addition of a 1.0 thin metal foil support 70 which is embodied in the U-shaped channel formed by the legs 18, 38 and base 20 of the carrier 12.

Heretofore, stumped metal supports and serpentine wire supports of about 0.03 inches (0.75 mm) in thickness have been used for this purpose. The present invention uses a different approach. A metal foil support is provided that is very thin compared to known supports, preferably between about 0.002 and 0.01 inches (0.05 and 0.25 mm) in thickness, more particularly about 0.005 inches (0.125 mm). The support provides shape retention, affords rigidity to the corners and prevents linear shrinkage of the seal. The support is preferably formed from an aluminum or stainless steel, preferably aluminum, foil. Because it is thin the foil can be formed into the desired shape in one operation by a mandrel without the need for a series of preforming rollers. The metal foil support can be bent into the desired shape, for example a U-shape, before or after the thermoplastic elastomer carrier is extruded onto the support.

In an alternative embodiment of the invention, the single strip of foil 70 shown in FIG. 2 can be replaced by two strips for reinforcing the corners, one at each corner.

Figure 3:
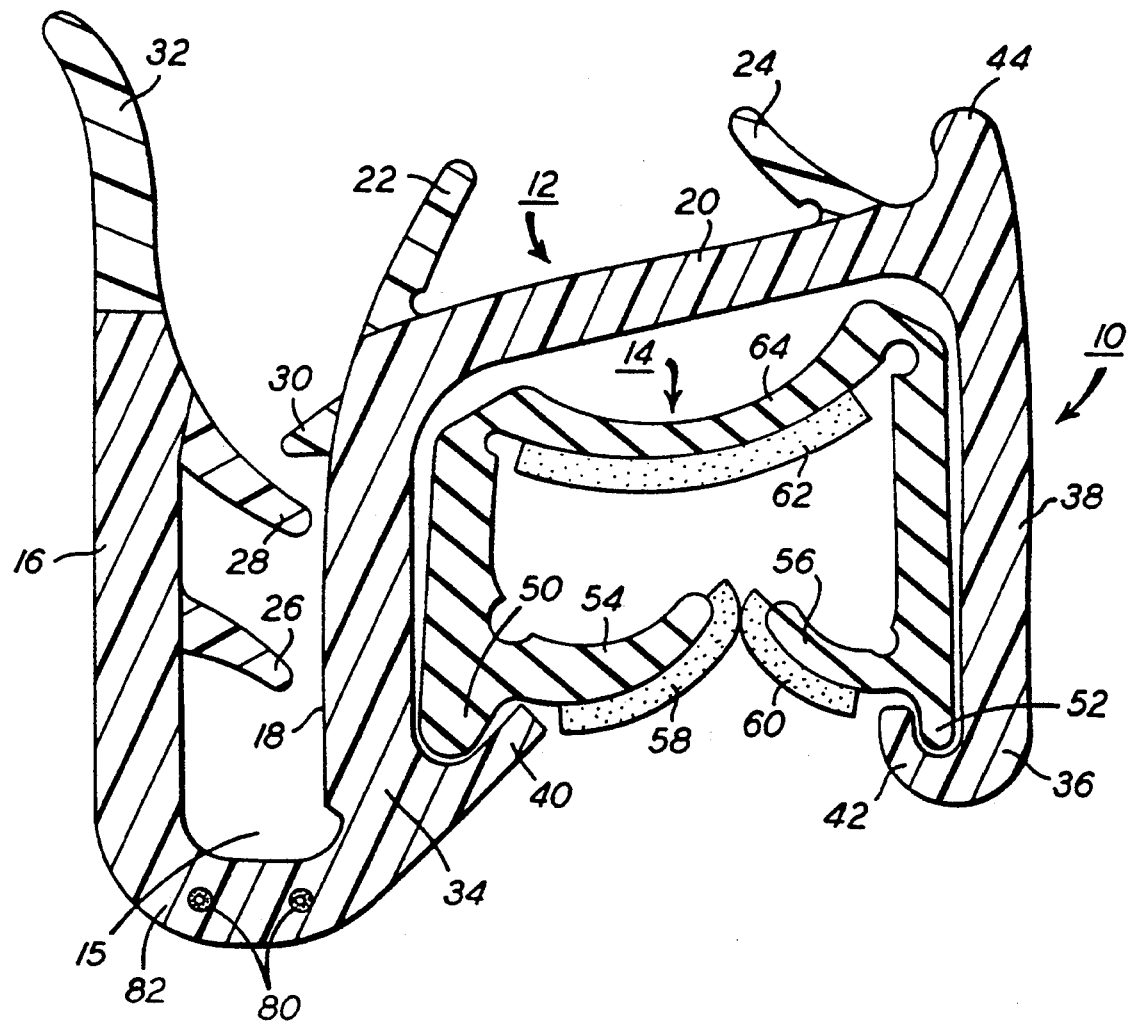
FIG. 3 is a section of a seal in accordance with a third aspect of the invention and incorporates a fiberglass cord.

In a third embodiment of the invention, FIG. 3, the window seal is essentially the same as that described for FIG. 1 with the addition of one or more fiberglass cords 80 to the base 82 of the U-shaped channel formed by the legs 16 and 18. The fiberglass cord(s) prevents linear shrinkage of the elastomer and is incorporated during extrusion of the elastomer.

Figure 4:
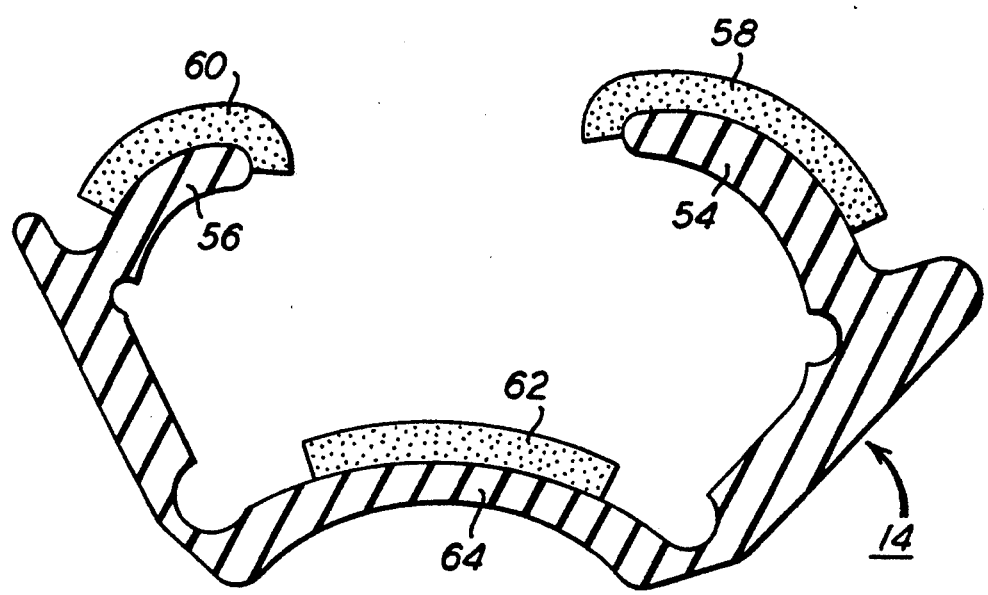
FIG. 4 is a section of the rubber insert in an extruded position for easy application of a sliding surface.

In FIG. 4, the resilient insert 14 is shown in the relatively flat, open configuration obtained by extrusion which facilitates the application of the sliding surface, 58, 60, 62 to the surfaces of the lobes 54, 56 and the inside surface 64 of the insert.

Figure 5:
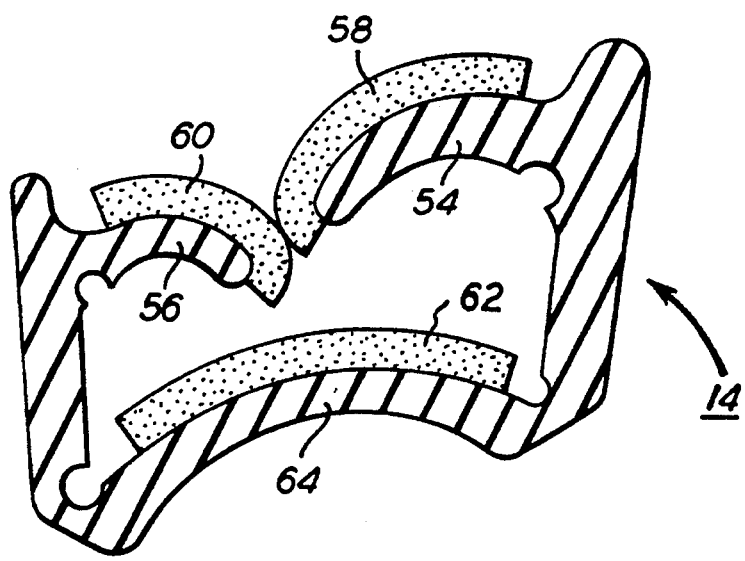
FIG. 5 is a section of the rubber insert in an installed position.

FIG. 5 shows the resilient insert 14 in the installed position after application of the sliding surface and illustrates how the lobes 54, 56 engage and close the channel.

In another aspect of the invention there is provided a method for assembling a flush glass window seal in which the thermoplastic elastomer carrier, for example as described in FIG. 1, is obtained by coextruding the thermoplastic elastomers of different durometer values to form a substantially rigid, dual durometer thermoplastic carrier in a one-piece generally U-shaped configuration, for receiving a resilient insert. The extrusion temperature is generally between about 150° to 250° C., preferably about 200° C. In some applications the extrusion is further subjected to thermal molding to conform to the shape of the vehicle body. The resilient insert is formed by extruding an elastomer, preferably an EPDM rubber, in a generally flat configuration and curing said extrusion. In a preferred embodiment of the invention the flat extrusion is then provided with a sliding surface, for example, by flocking. The extruded insert is then folded into the U-shaped carrier to mechanically secure them together, for example, by interlocking the anchor lobes of the insert with the curved extensions of the carrier.

In another aspect of the invention the thermoplastic carrier, for example as described in FIG. 1, is obtained by thermally molding the thermoplastic elastomers of different durometer values to form a substantially rigid, dual durometer thermoplastic carrier in a one-piece generally U-shaped configuration, for receiving a resilient insert. The molding temperature is generally between about 150° to 250° C., preferably about 200° C.

This invention thus provides a flush glass sealing system which is easily assembled from a substantially rigid, dual durometer thermoplastic carrier and a resilient insert. The carder can be readily color matched with an automobile body or interior trim and has a desirable high gloss. The assembly is lighter, less expensive, and easier to install than known seals.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A method for assembling a flush glass window seal comprising:

coextruding thermoplastic elastomers of different durometer values to form a substantially rigid, dual durometer thermoplastic elastomer carrier in a one-piece, generally U-shaped configuration for receiving a resilient insert;

extruding a generally fiat, resilient insert for said thermoplastic elastomer carrier;

folding said resilient insert into a generally U-shaped configuration; and pressing said folded insert into the carrier to mechanically secure the insert to the carrier.

2. The method according to claim 1 further comprising flocking the generally fiat, resilient insert.

3. The method according to claim 1 further comprising curing of the extruded, resilient insert.

4. A method for assembling a flush glass window seal comprising:

molding thermoplastic elastomers of different durometer values to form a substantially rigid, dual durometer thermoplastic elastomer carrier in a one-piece, generally U-shaped configuration for receiving a resilient insert;

extruding a generally flat, resilient insert for .said thermoplastic elastomer carrier;

folding said resilient insert into a generally U-shaped configuration; and pressing said folded insert into the carrier to mechanically secure the insert to the carrier.

5. The method according to claim 4 further comprising flocking the generally fiat, resilient insert.

6. The method according to claim 4 further comprising curing of the extruded, resilient insert.

* * * * *

UNITED STATES PATENT AND TRADEMARK OFFICE
CERTIFICATE OF CORRECTION

PATENT NO. : 5,343,609          Page 1 of 2
DATED      : September 6, 1994
INVENTOR(S): Michael J. McManus It is certified that error appears in the above-indentified patent and that said Letters Patent is hereby corrected as shown below:

Abstract. Line 3, after "elastomer" delete the comma (,).

Column 1, line 61, before "metal" delete the period (.).

Column 2, line 27, delete "carder" and insert -- carrier --.

Column 6, line 5, delete "robber" and insert -- rubber --.

Column 6,/8, line before "insert" delete the colon (:).

Column 6, line 12, delete "carder" and insert -- carrier --.

Column 6, line 16, delete "carder" and insert -- carrier --.

Column 6, line 18, delete "comers" and insert -- corners --.

Column 6, line 47, delete "1.0".

Column 6, line 50, delete "stumped" and insert -- stamped --.

Column 7, line 48, before "flush" delete the period (.).

UNITED STATES PATENT AND TRADEMARK OFFICE
CERTIFICATE OF CORRECTION

PATENT NO. : 5,343,609
DATED : September 6, 1994
INVENTOR(S) : Michael J. McManus It is certified that error appears in the above-indentified patent and that said Letters Patent is hereby corrected as shown below:

Column 8, line 2, delete "carder" and insert -- carrier --.

Column 8, line 39, before "said" delete the period (.).

Column 8, line 21, after "generally" delete "fiat" and insert -- flat --.

Signed and Sealed this

Third Day of March, 1998

*Attest:*

BRUCE LEHMAN

*Attesting Officer*   *Commissioner of Patents and Trademarks*